April 15, 1924.
A. FAEHN
SPRINKLER FOR CORN SHREDDERS
Filed Jan. 31, 1923   2 Sheets-Sheet 1
1,490,605
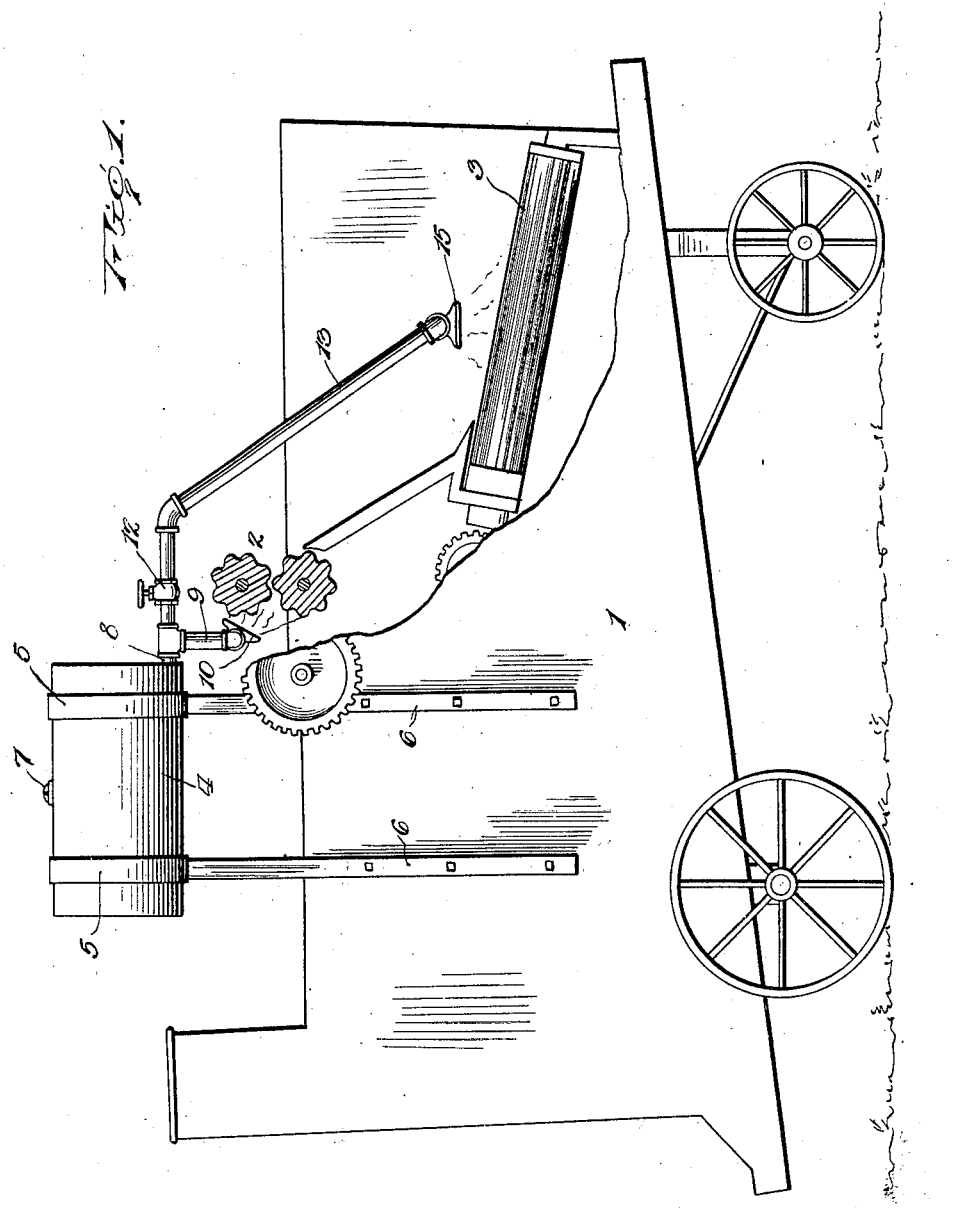
Inventor
August Faehn
By
Lacey & Lacey, Attorneys April 15, 1924.  1,490,605
A. FAEHN
SPRINKLER FOR CORN SHREDDERS
Filed Jan. 31, 1923   2 Sheets-Sheet 2
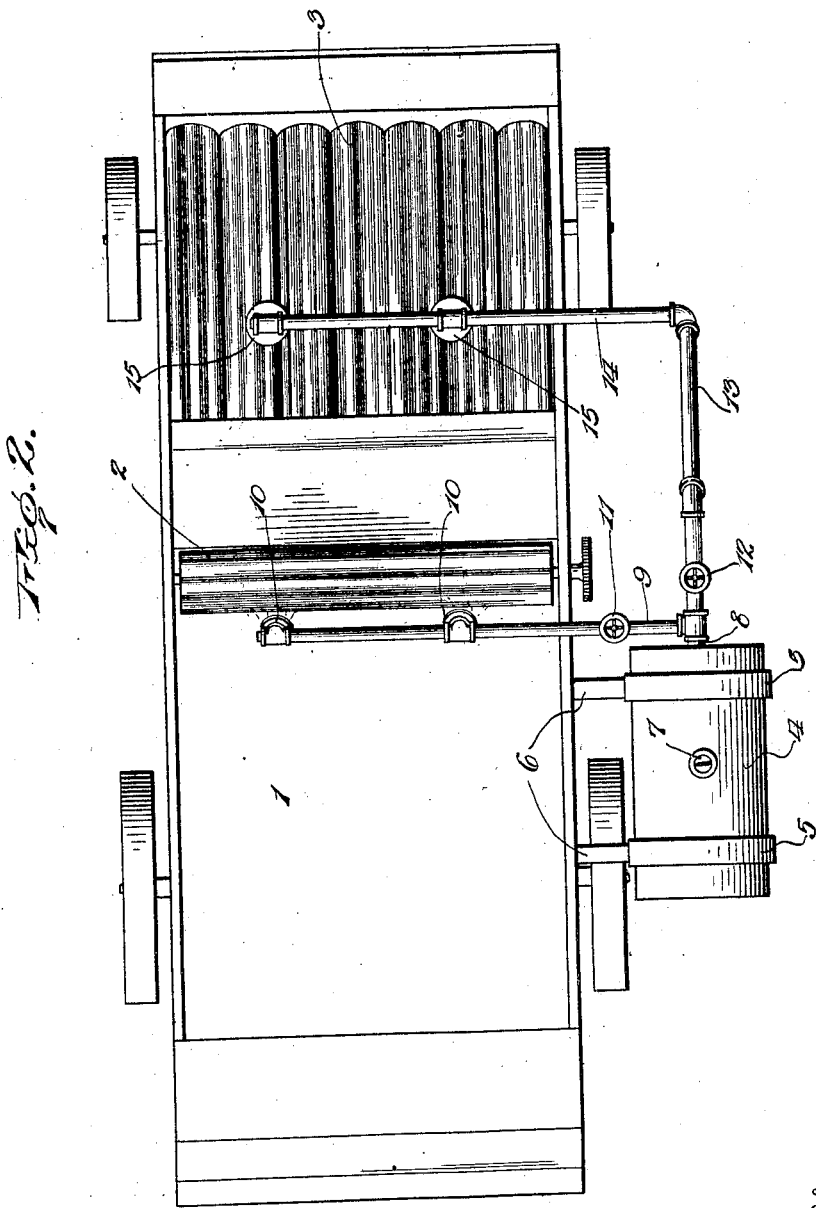
Inventor
August Faehn
By Lacey & Lacey, Attorneys Patented Apr. 15, 1924.

1,490,605

UNITED STATES PATENT OFFICE.

AUGUST FAEHN, OF WALLACE, SOUTH DAKOTA.

SPRINKLER FOR CORN SHREDDERS.

Application filed January 31, 1923. Serial No. 616,129.

*To all whom it may concern:*

Be it known that I, AUGUST FAEHN, a citizen of the United States, residing at Wallace, in the county of Codington and State of South Dakota, have invented certain new and useful Improvements in Sprinklers for Corn Shredders, of which the following is a specification.

This invention relates to corn shredders and has for its object the provision of simple and inexpensive apparatus which may be readily mounted upon any corn shredder and by the use of which the efficiency of the machine will be increased. I have found that, when corn is very dry or the rollers of the machine are very dry, as, for instance, when there has been a drought and the corn has not received moisture for a considerable period, the rollers of the shredding machine do not obtain a proper hold upon the plants so as to cleanly and easily snap the ears of corn from the stalks and strip the husks from the ears. My invention overcomes this disadvantage by providing a very simple device which may be easily attached to any shredder and will supply moisture to the snapping and husking rolls in regulated quantities so that the desired grip upon the plants will be obtained and the operation of removing the ears from the stalks and the husks from the ears will be cleanly and rapidly performed. The invention is illustrated in the accompanying drawings and will be hereinafter fully set forth.

In the drawings:

Figure 1 is a view, partly in side elevation and partly broken away, of a conventional corn shredder having my improvements applied thereto, and Fig. 2 is a plan view of the same.

The shredding machine 1 may be of any approved form and is shown as equipped with a pair of co-operating snapping rollers 2 disposed transversely at the top of the machine and longitudinally disposed inclined husking rollers 3 in a lower part of the machine. In carrying out my invention, I employ a tank 4 of suitable form and dimensions, around which are secured supporting bands 5 which are in turn secured to or formed integral with the upper ends of standards 6 which are rigidly secured upon the side of the corn shredder. The tank is provided with any convenient form of opening in its top, indicated at 7, and from one end of the tank an outlet pipe 8 extends. A branch pipe 9 is carried from the outlet pipe transversely of the machine adjacent the snapping rollers 2, and upon this pipe are mounted sprinkler heads 10 of any approved design so disposed that they will discharge a spray of water laterally upon the rollers, as shown most clearly in Fig. 1. One or more of these sprinkler heads may be employed according to the dimensions of the machine and the flow to the same is controlled by a cut-off valve 11 in the branch pipe 9, as will be readily understood. The main outlet pipe 8 extends parallel with the side of the corn shredder and is equipped with a cut-off valve 12 so that the flow therethrough may be regulated, the outer end portion of the pipe being carried downwardly, as shown at 13, and coupled to a transverse delivery branch 14 which extends into the corn shredder above the husking rolls 3, as shown. One or more sprinkler heads 15 are mounted upon the said delivery pipe 14 in position to discharge a spray of water upon the husking rolls, and these sprinkler heads may, like the sprinkler heads 10, be of any preferred design.

In the use of the apparatus, the tank 4 is filled with water and the valves 11 and 12 are opened to any desired extent so that the water may flow to the several sprinkler heads and escape therefrom in proper quantities to moisten the rolls or the corn delivered thereto to such an extent as experience and observation may deem most advantageous. My sprinkling attachment does not interfere with the usual operation of the corn shredder nor necessitate any re-arrangement or re-construction of any of the parts. It may be applied at a very slight expense to any existing shredder and will supply needed moisture to the rolls so that they will properly grip the plant material and deliver the stripped ears of corn clean and free of all husks.

Having thus described the invention, what is claimed as new is:

1. The combination with a corn shredder having a pair of transversely mounted snapping rollers and a series of longitudinally mounted husking rollers in front of and below said snapping rollers; of a unit detachably mounted on the corn shredder for sprinkling said snapping and husking rollers separately; said unit comprising a water tank, a main delivery pipe attached to said tank, branch pipes from said main pipe, a cut-off valve and sprinkler heads on each of said branch pipes, one of said branch pipes running parallel with said snapping rollers to the rear thereof and the other of said pipe branches being situated medially above said husking rollers and running transversely thereof, and a support including bands embracing said tank with standards carrying said bands and bolted to the corn shredder.

2. The combination with a corn shredder having snapping and husking rollers; of a sprinkler unit comprising a common water tank, a pipe leading from said tank to said snapping rollers, a separate pipe leading from the tank to said husking rollers, individual cut-off valves for each of said pipes, sprinkler elements associated with said pipes, and means for detachably mounting the unit on the corn shredder.

In testimony whereof I affix my signature.

AUGUST FAEHN. [ L. S. ]